Figures 1, 2:
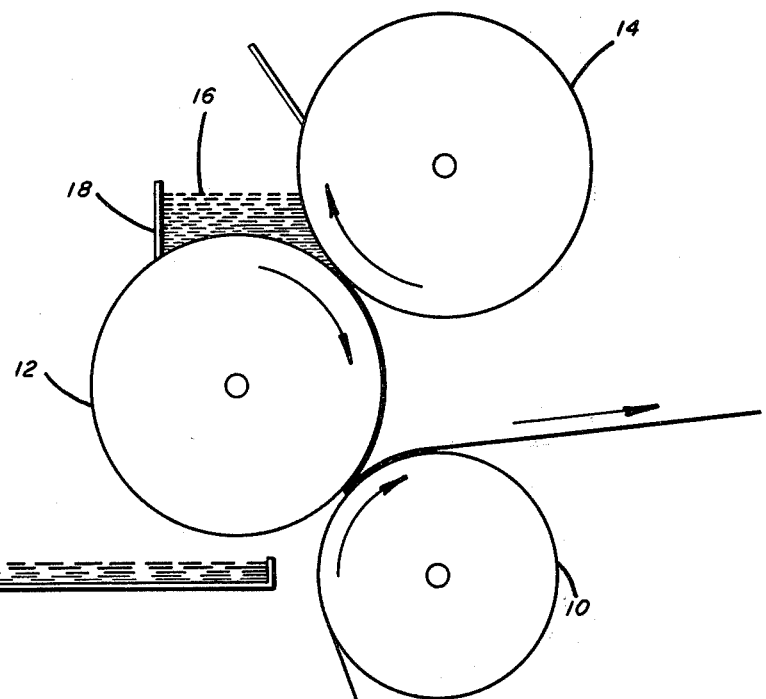

United States Patent [19]

Conger et al.

[11] 4,059,709
[45] Nov. 22, 1977

[54] PROCESSES OF APPLYING URETHANE TOP COATINGS TO RESILIENT FLOOR COVERINGS

[75] Inventors: Robert P. Conger, Park Ridge, N.J.; Vincent F. Pogozelski, Newtown, Pa.

[73] Assignee: Congoleum Corporation, Kearny, N.J.

[21] Appl. No.: 688,804

[22] Filed: May 21, 1976

[51] Int. Cl.$^2$ .......................... B05D 1/36; B05D 3/00; B05D 5/00
[52] U.S. Cl. .................................... 427/264; 427/265; 427/270; 427/276; 427/278; 427/288; 427/407 B; 427/407 D; 427/407 G; 427/412
[58] Field of Search ............... 427/264, 265, 270, 276, 427/278, 288, 407 B, 407 D, 407 G, 412

[56] References Cited
U.S. PATENT DOCUMENTS

| | | | |
|---|---|---|---|
| 3,278,322 | 10/1966 | Harkins et al. | 427/278 |
| 3,574,659 | 4/1971 | Kwart et al. | 427/258 |

*Primary Examiner*—Michael R. Lusignan
*Attorney, Agent, or Firm*—Richard T. Laughlin

[57] ABSTRACT

In a process for manufacturing a resilient, resinous floor covering having a polyurethane surface coating, the in-line manufacturing improvement which comprises: applying to a foamable resinous sheet material a urethane coating composition having a viscosity in the range of from about 10 centipoises to about 100 centipoises, the application of the urethane coating composition being accomplished by a reverse-roll coating procedure wherein the casting ratio is in the range of from about 0.8:1 to about 1.1:1; and then, in an in-line manufacturing step, heating the coated, foamable, resinous sheet material to dry and to cure the urethane coating composition and to blow the foamable, resinous sheet material to form a resilient, resinous floor covering having a polyurethane surface coating, the curing of the urethane coating composition not being in excess of about 80% during the heating and blowing of the foamable resinous sheet material.

10 Claims, 2 Drawing Figures

APPLYING A PLASTISOL TO A BACKING SHEET
AND GELLING THE PLASTISOL
↓
PRINTING A PATTERN
ON THE GELLED PLASTISOL
↓
APPLYING A WEAR LAYER
TO THE PRINTED GELLED PLASTISOL
AND GELLING THE WEAR LAYER
↓
APPLYING A URETHANE TOP COATING
TO THE GELLED WEAR LAYER
BY REVERSE-ROLL COATING MEANS
AND HEATING AND BLOWING THE PRODUCT

PROCESSES OF APPLYING URETHANE TOP COATINGS TO RESILIENT FLOOR COVERINGS

GENERAL BACKGROUND OF THE INVENTION

In the manufacture of resilient, resinous floor coverings it has long been desired to use polyurethane protective coatings as the top surface thereof, due to the very desirable properties and characteristics of polyurethane coatings which include good resistance to abrasion and solvent and chemical attack, good flexibility and impact resistance, good toughness, good high gloss retention, good surface texture, good adhesion to many materials, good weatherability, etc.

Unfortunately, although urethane coatings can normally be applied quite easily by dipping, spraying, brushing, rolling, and other conventional coating methods to adhere satisfactorily to a wide variety of materials, difficulties have been encountered in their application to foamable, resinous sheet materials wherein it is desired that the application of the urethane coating composition be conducted in an in-line manufacturing process wherein the urethane coating composition is applied in one step and the heating, blowing and foaming of the resinous sheet materials take place in another step in one passage through the manufacturing operation. To require two passages of the sheet materials through the manufacturing operation would, of course, be economically undesirable.

For example, if the urethane coating composition were to be applied in an in-line manufacturing operation by a conventional curtain coating procedure wherein the urethane coating composition is delivered in the form of a falling sheet or curtain to the foamable, resinous sheet material, difficulties are encountered because the variable speed required in the subsequent heating, blowing and curing operation was more or less incompatible with the preferably controlled, constant speed generally required of the curtain coating procedure. And, on the other hand, if a reverse-roll coating procedure were to be used which has a greater adaptability to the varying speeds of operation, difficulties were encountered in the obtaining of satisfactory, uniformly coated, bubble-free urethane top coatings.

Prior to the present invention, therefore, no completely commercially satisfactory or really successful manufacturing operation has been devised to provide for an in-line polyurethane coating operation and a resin blowing and curing operation in the resilient, resinous floor covering industry.

GENERAL PURPOSES AND OBJECTS OF THE PRESENT INVENTION

It is therefore a principal purpose and object of the present invention to provide for an in-line manufacturing operation wherein the urethane coating composition can be applied to the surface of previously unblown, foamable, resinous sheet materials and then heated to dry and cure the urethane coating and to blow the foamable, resinous sheet materials in one pass of the operation.

BRIEF SUMMARY OF THE PRESENT INVENTION

It has been found that this principal purpose and object, as well as other purposes and objects which will become clear from a further reading of this specification, can be accomplished by providing, in a process for manufacturing a resilient, resinous floor covering having a polyurethane surface coating, the in-line manufacturing improvement which comprises: applying to a previously unblown, foamable, resinous sheet material a urethane coating composition having a viscosity in the range of from about 10 centipoises to about 100 centipoises, the application of the urethane coating composition being accomplished by a reverse-roll coating procedure wherein the casting ratio is in the range of from about 0.8:1 to about 1.1:1; and then, in an in-line manufacturing step, heating the coated, foamable, resinous sheet material to dry and to cure the urethane coating composition and to blow the foamable, resinous sheet material to form the resilient, resinous floor covering having a polyurethane surface protective coating, the curing of the urethane coating composition not being in excess of about 80% during the heating and blowing of the foamable resinous sheet material.

The invention will be more fully understood from the description which follows, taken in conjunction with the accompanying self-explanatory drawing in which there is illustrated a preferred mode of operation embodying the principles of the present invention. It is to be understood, however, that the present invention is not to be construed as limited to the constructions disclosed or the modes of operation described, except as determined by the scope of the appended claims.

In the drawing,

FIG. 1 is a schematic flow chart diagrammatically showing the type of operation by which the present invention may be carried out in actual practice; and FIG. 2 is a schematic showing of a typical conventional reverse-roll coating procedure of use in carrying out the principles of the present invention.

In FIG. 1, there is illustrated a schematic flow chart of a typical operation for manufacturing resilient, resinous floor coverings to which the principles of the present invention are applicable, the first step being the application to a backing sheet material of a foamable, resinous polymer, such as a plastisol normally in a liquid or a semi-liquid form, followed by the heating and gelling of the foamable, resinous polymer without actually blowing or foaming the same. This, of course, is accomplished very easily by simply heating to an elevated temperature which is high enough to gel and firm the resinous material but not sufficiently high enough to activate the blowing agent in the composition to cause blowing or foaming. This is a conventional operation in the industry and should require no further expanation or description.

THE BACKING SHEET MATERIAL

The backing sheet material may be a matted or felted fibrous sheet, a woven fabric, a knitted fabric, a nonwoven fabric, or substantially any type of sheet material and may be formed of mineral fibers, natural fibers of wool or of cellulosic origin, synthetic or man-made fibers or filaments, such as rayon, nylon, polyesters, polyolefins, etc., asbestos, glass wool, mineral or slag wool, metallic threads, etc. Such a sheet material may be previously impregnated or saturated with a water-resistant or strengthening material, such as a vinyl resin, a butadiene-styrene resin, or other thermoplastic, or cross-linking or thermosetting resins, if so desired or required.

Additional specific examples of other backing sheet materials may be found in U.S. Pat. Nos. 3,293,094 and 3,293,108 which issued on Dec. 20, 1966.

THE FOAMABLE RESINOUS POLYMERIC MATERIAL

The foamable resinous polymeric material which is applied to the backing sheet material is preferably a dispersion or a suspension of a resin in a liquid or semi-liquid medium. The dispersing or suspending medium may be water in the case of an aqueous latex, or it may be an organic solvent in the case of an organosol, or it may be a plasticizer in the case of a plastisol.

Plastisols are preferred because of their ease of handling and the fact that their use does not require the subsequent removal or large volumes of water in the case of an aqueous latex, or the subsequent removal and possible necessary recovery of large amounts of organic solvents in the case of an organosol.

The preferred and most widely used resin present in such a plastisol is polyvinyl chloride, either as a homopolymer, copolymer, terpolymer, block polymer, etc. However, many others resins are of use, such as polyolefins as polyethylene and polypropylene, the acrylates and methacrylates, polyamides, polystyrenes, phenolics, ureas, synthetic rubber, urea-formaldehyde, neoprene, etc.

Various plasticizers, such as dibutyl sebacate, butyl benzyl phthalate, di(2-ethylhexyl) phthalate, dioctyl phthalate, etc., are also included in the foamable resinous polymeric compositions, as well as various stabilizers, such as phenyl phthalate, dibasic lead phosphite, etc., to reduce the harmful effects of degradation due to light and heat. Pigments such as titanium dioxide, as well as blowing agents such as azodicarbonamide are also included. Accelerators, inhibitors, catalysts, anitoxidants, viscosity-changing agents, etc., may also be included. Typical formulations and compositions of foamable resinous polymeric materials are to be noted in the previously-mentioned U.S. patents.

The thickness of the layer of foamable resinous polymeric composition, as applied to the backing sheet material, is in the range of from about 0.005 inch to about 0.040 inch, as measured prior to the blowing and foaming operation.

After the foamable, resinous polymeric composition is applied to the backing sheet material, it is then heated in an oven or other suitable heating apparatus maintained at an elevated temperature of from about 240° F. to about 450° F. for a period of time of from about 1 minute to about 4 minutes whereby it gels and becomes firm. The temperature and time are interdependent and the higher the temperature, the shorter the time, and vice versa. The elevated temperature, however, is not high enough as to activate or decompose the blowing agent in the composition as to cause blowing or foaming at this time.

THE PRINTING OF THE GELLED PLASTISOL

After the foamable, resinous polymeric composition or plastisol has been heated to a sufficiently high temperature, whereby it gels and becomes firm without being blown, it is then printed or coated with a printing composition containing a dye or a pigment or other coloring material to form the desired pattern or color. The printing composition or plastisol may also contain resins, plasticizers, stabilizers, anti-oxidants, etc. Drying is accomplished by exposure to air or by conventional heating and drying procedures.

Typical printing ink compositions are to be noted in the U.S. patents previously cited hereinbefore. Inhibitors are included or omitted from the printing ink compositions of the present invention, depending upon whether or not inhibition is desired or not.

THE WEAR LAYER

A wear layer having an average thickness of from about 0.002 inch to about 0.025 inch is then applied relatively uniformly over the gelled plastisol. The wear layer is normally a clear, unpigmented resinous composition and its basic purpose is normally to give to the resilient floor covering improved wearing qualities. Many of the constituents of the previously described foamable, resinous polymeric compositions are also present in the formulations of the wear layer, notably the polyvinyl chloride or other resin, plasticizers, stabilizers, etc., but other constituents such as the blowing agent, pigments, etc. are normally omitted. Typical formulations for wear layers are to be noted in the U.S. patents previously cited hereinbefore.

After the wear layer has been applied to the printed, gelled plastisol, it is heated in an oven or other suitable heating apparatus maintained at a sufficiently high temperature of from about 240° F. to about 450° F. for a period of time of from about 1 minute to about 4 minutes whereby it gels and becomes firm. Such elevated temperature, however, is merely sufficient to gel and to firm and resinous wear layer but is not high enough to activate or decompose the blowing agent to cause blowing or foaming of the foamable materials.

The product is now ready for the application of the urethane top coating by means of the reverse-roll coating procedure to be followed directly by the in-line heating and blowing operation to yield the resilient, resinous floor covering having the desired polyurethane top surface coating. Such is accomplished by simply one passage through the apparatus and does not involve a second pass which would require rolling of the product and subsequent unrolling of the product of the second pass, followed by another rolling of the product.

THE URETHANE COATING COMPOSITION

The urethane coating composition may comprise one or more of the five principal types of commercially available urethane coating formulations which are described according to the accepted A.S.T.M. D968-51 designations. The main distinctions between these five types, in addition to their chemical differences, lies in the manner and means whereby the urethane coating is cured, that is, whether it is cured by reaction with the oxygen from the air, rather than by the reaction of its NCO groups (Type I); or by drying by solvent evaporation and curing by reaction with the moisture in the air (Type II); or by heating and baking to create a reacted and cured urethane coating (Type III); or by heating to form a prepolymer which is supplied with a separate catalyst, such as a tertiary amine (Type IV); or by solvent evaporation and a reaction at ambient conditions without the aid of a catalyst (Type V).

Addtionally, these types of urethane coatings are also categorized by the number of components in the system. A.S.T.M. Types I, II, and III are one component systems, whereas the A.S.T.M. Types IV and V are two component systems, Types II and IV or mixtures or combinations thereof in various proportions are the preferred urethane coatings of the present invention.

Type II is based on an isocyanate-terminated prepolymer that dries by solvent evaporation and cures by reaction with the moisture in the atmosphere. Aromatic, aliphatic or cycloaliphatic diisocyanates or mixtures or combinations thereof provide the NCO source, while the reacting polyol hydroxyl groups are provided by glycols, glycerols, trialkylolalkanes, alkane diols, etc. or mixture or combinations thereof. Other polyhydroxy compounds are also of use.

Type IV is prepared from aromatic, aliphatic or cycloaliphatic diisocyanates, or mixtures or combinations thereof, and such reacting polyol hydroxy groups supplied by polyesters, polyethers, castor oil, etc. Other polyhydroxy compounds are also of use. The diisocyanate and polyol compounds are heated to form a prepolymer which is supplied with a separate catalyst such as a tertiary amine. Typical specific examples of such aromatic, aliphatic and cycloaliphatic diisocyanates are: tolylene diisocyanate; xylylene diisocyanate; 4,4'-diphenylmethane diisocyanate; 1,5-naphthalene diisocyanate; 3,3'-dimethoxy-4,4'-biphenyl diisocyanate; phenylene diisocyanate; 3,3'-dimethyl-4,4'-biphenyl diisocyanate; 4,4'-biphenyl diisocyanate; methylene-bis-cyclohexyl diisocyanate; 1,6-hexamethylene diisocyanate; 2,2,4-trimethyl-1,6-hexane diisocyanate; trimethyl hexamethylene diisocyanate; isophorone diisocyanate; dimer acid diisocyanate; trimer of hexamethylene diisocyanate; etc.

Typical specific examples of such reacting polyol poly-hydroxyl compounds are: 1,2-ethanediol; 1,2-propanediol; 1,3-propanediol; 1,4-butanediol; 1,2,3-propanetriol; trimethylol propane; trimethylol ethane; castor oil; polyoxypropylene diol; polyoxyethylene glycol; polyoxymethylene glycol; polytetramethylene glycol; poly(oxypropylene) adducts of glycerine; polyoxypropylene adducts of trimethylol propane; n,n,n,n-tetrakis (2-hydroxypropyl) ethylenediamine; poly(oxypropylene) adducts of pentaerytritol; a-methyl glucoside; b-methyl glucoside; erythritol; pentaerythritol; adonitol; arabitol; sorbitol; mannitol; dulcitol; adipic acid polyesters; sebacic acid polyesters; succinic acid polyesters; polycaprolactone;

Polynuclear polyisocyanates and other polyhydroxy compounds are also of use within the broader aspects of the present inventive concept.

More broadly speaking, however, the polyurethane resins may be considered a class of resins obtained by the reaction of diisocyanates with organic compounds containing two or more active hydrogens (e.g., phenols, amines, hydroxyl and carboxylic compounds) to form polymers having free isocyanate groups. Under the influence of heat or catalysts or both, the latter will react with each other, with water, glycols, diamines, etc., to form a thermosetting resin.

The specific polyurethane coating composition which is used in the application of the principles of the present invention is not critical nor does it relate to the essence of the inventive concept. However, it is essential and critical that the viscosity of the urethane coating composition fall within the ranges which are specified herein and that the casting ratio similarly fall within specified range as set forth herein.

More specifically, and for reasons which will become more clear from a further reading of this specification, the urethane coating composition must have a viscosity of from about 10 centipoises to about 100 centipoises at room temperature. By way of explanation and comparison, the viscosity of water at 68.4° F. is one centipoise and the viscosity of an Eastern S.A.E. lubricating oil at 60° F. is about 100 centipoises.

THE URETHANE COATING OPERATION

The urethane coating composition is cast upon the gelled wear layer as a top coating and has a wet thickness of from about 0.0015 inch to about 0.015 inch which will ultimately yield a dry thickness of from about 0.0005 inch to about 0.005 inch after heating, drying, and curing.

The application of the urethane coating composition on top of the gelled wear layer is accomplished by a specially adjusted reverse-roll coating apparatus, such as illustrated in FIG. 2. There is disclosed therein a length of continuous sheet material M, the uppermost layer of which is the gelled wear layer. The sheet material is delivered from a source of supply (not shown) to the surface of a rotatable, elastomeric back-up roll 10, rotating in a clockwise direction as shown. The back-up roll 10 is in contact with a rotatable, coating or casting roll 12 also rotating in a clockwise direction. The speeds of these rolls are adjustable so that the ratio of proportions of their speeds may be varied, as desired or required.

The relative peripheral speeds of the coating or casting roll 12 and the back-up roll 10 is termed the casting ratio which is best defined by the following formula:

$$\text{Casting Ratio} = \frac{\text{Peripheral speed of casting roll}}{\text{Peripheral speed of back-up roll}}$$

It is essential that this ratio be maintained within the range of from about 0.8:1 (in which case the coating roll is moving at a lower peripheral speed than the back-up roll) to about 1.1:1 (in which case the coating roll is moving at a higher peripheral speed than the back-up roll). These rolls are moving in opposite directions at their points of closest proximity and the coating is actually being delivered to and wiped on the passing sheet material. This casting ratio must be maintained within the specified range in order to obtain the proper wiping action and to attain the desired results of the present inventive concept.

A rotatable metering roll 14, also rotating in a clockwise direction, picks up urethane coating composition 16 contained in a trough or supply pan 18 and the exact amount of urethane coating composition 16 is accurately metered out between the metering roll 14 and the coating or casting roll 12 to be subsequently applied to the sheet material M as it travels around the periphery of the elastomeric back-up roll 10.

Additional details of the reverse-roll coating procedures are to be found in the Encyclopedia of Polymer Science and Technology, Volume, 3, pages 765–807, "Coating Methods — Survey" by D. G. Higgins. In passing, it is to be noted that this survey recommends in Table 1 thereof that the usual viscosities range for coatings applied by the reverse-roll coating procedure is in the range of 1,000–20,000 centipoises. This range is to be compared and contrasted to the previously-mentioned range of from about 10 centipoises to about 100 centipoises for the application of the urethane coating composition of the present inventive concept.

THE HEATING AND BLOWING OPERATION

After the urethane coating composition has been applied to the surface of the gelled wear layer, the coated product is ready for the heating operation which heats, dries, blows and foams the resinous materials and cures the same. Those materials which do not contain blowing agents are, of course, merely dried and cured, without any blowing or foaming. This is accomplished in an oven or other suitable heating apparatus maintained at an elevated temperature of from about 150° F. to about 450° F. but preferably from about 260° F. to about 410° F., for a period of time of from about 1 minute to about 8 minutes, but preferably to about 4 minutes only.

The heating operation dries and cures the urethane coating composition and blows the foamable, resinous polymeric material so that it expands to various blow ratios of from about 2:1 to about 5:1, depending upon the particular circumstances which are involved.

During the heating and blowing of the foamable, resinous polymeric material, control is exercised over the extent of the curing and hardening of the urethane resin coating. Curing and hardening of urethane resin coatings may start and take place at as low as room or ambient temperature and thus the curing and hardening operation starts well before the blowing and foaming operation begins in the oven. However, if the curing and hardening operation is permitted to be completed before the blowing and foaming operating starts, then the urethane resin coating is sufficiently hardened and is sufficiently strong as to interfere seriously with the blowing and foaming operation and effectively prevent the desired expansion of the various land areas. As a result, when the blowing agent is activated or decomposes to initiate the desired embossing function, the land will tend to expand due to the pressures of the formed gases, but cannot do so vertically due to the resistance of the strong, cured, and hardened urethane resin coating. The land, therefore, expands horizontally or sideways into the depressed mortar areas, whereby the differential in height between the land and the mortar is lost and substantially no embossing takes place, with no raised lands or depressed mortars, and with the entire surface substantially flat and level.

The curing and hardening of the urethane coating is, therefore, controlled and limited so as not to exceed about 80%, as can be determined by infra red (IR) analysis for the presence of free NCO groups, using an internal standard as a basis of quantitative comparison. More specifically, the complete absence of free NCO groups in the IR analysis indicates substantially 100% curing and hardening and is completely undesirable. Curing percentages greater than 80% are also undesirable. In addition, surface roughening and cracking is noted at such levels of from greater than 80% to 100% curing in the oven.

Curing and hardening levels of from about 70% to 80% are most desirable as the curing and hardening is not too far advanced as to interefere with the blowing and embossing operation. Such curing range of from about 70% to 80% and, within the broader aspects of the present invention, from about 60% to 80%, is also desirable from a tackiness viewpoint, inasmuch as the surface of the urethane coating is no longer tacky in such range.

The control over the extent of the curing and hardening of the urethane coating is exercised by the heat and exposure time in the heating operation in the oven, but, more specifically and more selectively, by the amount, the concentration, and the type of curing catalyst used in the coating formulation. The extent of the curing and hardening operation is thus controlled.

The present invention will be further described with reference to the following specific Examples wherein there are disclosed preferred embodiments of the present inventive concept. However, it is to be stated out that such specific Examples are primarily illustrative of the invention and are not to be construed as limitative of the broader aspects of the present inventive concept.

EXAMPLE I

The backing sheet material is a 0.030 inch thick felt sheet of asbestos fibers impregnated with 5% of a urea-formaldehyde resin and 25% of a copolymer of butadiene and acrylonitrile. The asbestos sheet is heated to cure the urea-formaldehyde resin. Also, the asbestos sheet is coated with a size coating of one-half methyl methacrylate and one-half butyl acrylate in an amount equal to 0.025 pounds per square yard, followed by drying of the size coat.

The foamable plastisol coating composition which is applied to the backing sheet material has an average thickness of about 0.015 inch (as applied and wet) and has the following composition by weight:

|  | Parts |
| --- | --- |
| Polyvinyl chloride, dispersion grade, specific viscosity 0.6 | 50 |
| Polyvinyl chloride, dispersion grade, specific viscosity 0.4 | 50 |
| Butyl benzyl phthalate plasticizer | 52 |
| Alkyl aryl hydrocarbon secondary plasticizer | 18 |
| Azodicarbonamide blowing agent | 3 |
| Dibasic lead phosphite stabilizer-accelerator | 2 |
| Pigment (Titanium dioxide) | 5 |

The plastisol coating composition is gelled to a firm condition in an oven maintained at an elevated temperature of 300° F. The exposure time for the heating is 3 minutes.

The printing inks which are applied to the surface of the gelled and firm plastisol are applied in the desired pattern and have the following compositions by weight:

|  | Parts |
| --- | --- |
| Vinyl chloride-vinyl acetate copolymer | 8.5 |
| Methyl ethyl ketone | 51.5 |
| Titanium dioxide (55%) pigment | 25.0 |
| Trimellitic anhydride inhibitor | 15.0 |

|  | Parts |
| --- | --- |
| Vinyl chloride-vinyl acetate copolymer | 13.5 |
| Methyl ethyl ketone | 61.5 |
| Pigment | 25.0 |
| No inhibitor | 0.0 |

The printing ink compositions are heated and dried before the wear layer is applied.

A wear layer composition having the following composition by weight is then applied to the printed, gelled plastisol to an average thickness of about 0.010 inch, as applied and wet:

|  | Parts |
| --- | --- |
| Polyvinyl chloride, dispersion grade, specific viscosity 0.50 | 95.0 |
| Polyvinyl chloride, suspension grade, specific |  |

-continued

|  | Parts |
| --- | --- |
| viscosity 0.35 | 5.0 |
| Alkyl aryl modified phthalate ester plasticizer | 38.0 |
| Epoxidized tall oil ester secondary plasticizer | 5.0 |
| 2,2,4-trimethyl-1,3-pentanediol diisobutyrate | 7.0 |
| Stabilizer | 3.0 |
| Viscosity control agent | 1.2 |

The wear layer composition is gelled and firmed in an oven maintained at an elevated temperature of 300° F. The exposure time is 3 minutes.

The urethane coating composition is formulated as follows: an aliphatic diisocyanate (hexamethylene diisocyanate) is the NCO source; the reacting polyol polyhydroxyl groups are supplied by a mixture of polyesters and polyethers, with the polyesters forming the major proportion and the polyethers forming the minor proportion; and the catalyst is a mixture of tetrakis-2 hydroxypropyl ethylene diamine, a tertiary amine, and dibutyl tin dilaurate.

The urethane coating composition is applied to the surface of the gelled and firmed wear layer to a wet thickness of about 0.006. Its viscosity is 60 centipoises. The casting ratio used in the reverse-roll coating procedure is 0.95:1. The construction of the reverse-roll coating apparatus is substantially as described in FIG. 2 of the drawings.

The urethane-coated product is then heated in an oven in an in-line manufacturing operation at an elevated temperature of 385° F. for a period of time of 2 minutes and 45 seconds. During this time, solvent is being removed first, followed by the blowing or foaming of the foamable resinous materials and the curing of polyurethane top coating and other resinous materials.

The foamable plastisol increases in thickness from about 0.015 inch to about 0.045 inch, indicating a blow ratio of about 3:1. The urethane coating composition is dried and cured and decreases in thickness from about 0.006 inch (wet) to about 0.002 inch (dry). The backing sheet material and the wear layer do not change in thickness to any substantial degree and the total thickness of the final product is about 0.087 inch.

The speed of the sheet materials through the in-line manufacturing steps of the application of the urethane coating composition and the subsequent heating, blowing, and curing is a variable, determined by the inevitable variations in the speed of the manufacturing process. However, this does not create any problem or difficulty. The individual speeds of the two steps, although variable, change in unison and thus remain substantially equal to each other and are the same at any given moment and are thus compatible with the over-all manufacturing operation. No rolling of the product is required at the end of the urethane coating operation or any holding in temporary storage is required prior to the subsequent heating step.

The polyurethane top coating is found to be well adhered to the wear layer. The resulting product finds excellent use as a resilient, resinous floor covering material and exhibits the desirable properties and characteristics of polyurethane protective coatings previously enumerated.

EXAMPLE II

The procedures of Example I are followed substantially as set forth therein with the exception that the faomable plastisol composition applied to the felt backing material has the following formulation by weight:

|  | Parts |
| --- | --- |
| Polyvinyl chloride, dispersion grade, specific viscosity 0.6 | 50 |
| Polyvinyl chloride, dispersion grade, specific viscosity 0.4 | 50 |
| Alkyl aryl modified phthalate ester | 55 |
| Alkyl aryl hydrocarbon | 10 |
| Dibasic lead phosphite | 1.5 |
| Titanium dioxide | 5 |
| Azodicarbonamide | 2.5 |

The results are generally comparable to the results obtained in Example I. The resulting product finds excellent usage as a resilient, resinous floor covering material having a polyurethane top protective coating with desirable properties and characteristics.

EXAMPLE III

The procedures set forth in Example I are followed substantially as described therein with the exception that the peripheral speeds of the coating or casting roll and the back-up roll are adjusted and changed to yield a casting ratio of 0.8:1. As noted previously, in such an arrangement, the coating roll is actually moving with a peripheral speed less than that of the back-up roll.

The results are generally comparable to the results of Example I. The resulting product finds excellent use as a resilient resinous floor covering material having a polyurethane protective top coating with desirable properties and characteristics.

EXAMPLE IV

The procedures set forth in Example I are followed substantially as described therein with the exception that the peipheral speeds of the caoting or casting roll and the back-up roll are adjusted and changed to yield a casting ratio of 1:1. As noted previously, in such an arrangement, the coating roll is actually moving with a peripheral speed about equal that of the back-up roll.

The results are generally comparable to the results of Example I. The resulting product finds excellent use as a resilient resinous floor covering having a polyurethane protective top coating.

EXAMPLE V

The procedures set forth in Example I are followed substantially as described therein with the exception that the viscosity of the urethane coating composition is adjusted and changed to 40 centipoises. This is a less viscous coating composition than that used in Example I.

The results are generally comparable to the results of Example I. The resulting product finds excellent use as a resilient resinous floor covering material having a polyurethane protective top coating.

EXAMPLE VI

The procedures set forth in Example I are followed substantially as described therein with the exception that the viscosity of the urethane coating composition is adjusted and is changed to 100 centipoises. This is a more viscous coating composition than that used in Example I.

The results are generally comparable to the results of Example I. The resulting product finds excellent use as a resilient, resinous floor covering material having a polyurethane protective top coating.

EXAMPLE VII

The procedures described in Example I are followed substantially as set forth therein with the exception that the peripheral speeds of the coating or casting roll and the back-up roll are adjusted and changed so that they have a higher casting range of 2:1, which is outside the range of the present invention but which is more normal in the industry, and the viscosity of the urethane coating composition is increased to 500 centipoises which is outside the range of the present invention but is closer to the normal viscosity range of coating compositions used in reverse-roll coating procedures in industry.

The results are not satisfactory. The product is undesirably bubbled and is not acceptable commercially.

EXAMPLE VIII

The procedures set forth in Example I are followed substantially as described therein with the following exceptions:

A prepolymer is formed having the following formulation:

|  | Parts by Weight |
| --- | --- |
| Methylene bis cyclohexyl diisocyanate | 284 |
| Polyoxypropylene glycol (Voranol 2103-Dow) MW300 | 42 |
| Polyoxypropylene adduct of a Triol (Voranol 2070-Dow) | 125 |
| Dibutyl tin dilaurate catalyst | 4.5 |
| Xylene solvent | 450 |

The prepolymer formulation contains about 6.9% free NCO, as based on the weight of the total formulation.

This prepolymer is further formulated into a coating formulation as follows:

|  | Parts by Weight |
| --- | --- |
| Prepolymer | 75.3 |
| Polyoxyalkylene material based on pentaerythritol having a molecular weight of 500 (PEP-550) | 14.9 |

The viscosity of this urethane coating composition is 10 centipoises. Curing of the polyurethane resin top coating on the wear layer takes place to the extent of about 70% in the oven (385° F. for 2 minutes and 45 seconds), as determined by IR analysis for presence of free NCO groups, using an internal standard for quantitative comparison. The polyurethane resin coating is not too cured or too hardened as to interfere with the blowing operation and the expansion of the land areas. Embossing is good. The embossed product is acceptable. Subsequent air-curing increases the percentage of curing to about 100%.

EXAMPLE IX

The procedures set forth in Example VIII are followed substantially as described therein with the exception that 0.2 parts by weight of dibutyl tin dilaurate catalyst is added to the coating formulation. The viscosity remains at 10 centipoises. The additional amount of the catalyst accelerates the curing of the polyurethane resin top coating to the extent of about 80% in the oven. The polyurethane resin top coating is not too cured or too hardened as to interfere with the blowing operation and the expansion of the land areas. Embossing is moderate. Product is acceptable. Subsequent air-curing increases the percentage of curing to 100%.

EXAMPLE X

The procedures set forth in Example VIII are followed substantially as described therein with the exception that the coating formulation is formulated with the addition of 0.6 parts by weight of dibutyl tin dilaurate catalyst. The viscosity remains at 10 centipoises.

The additional amount of the catalyst accelerates the curing of the polyurethane resin top coating to the extent of about 90% in the oven. This is too high. The polyurethane resin top coating is hardened too much and is too strong. It interferes with the expansion of the land areas. The differential in heights between the lands and the mortars is very small. Embossing is poor. The product is not acceptable.

EXAMPLE XI

The procedures set forth in Example VIII are followed substantially as described therein with the exception that the source of the polyols is a mixture of polyesters and polyethers, with the polyesters forming the minor proportion of about 30% and the polyethers forming the major proportion of about 70%. This mixture is used in both the prepolymer and in the coating formulation.

The results of this Example are generally comparable to the results of Example VIII. The embossing is good and the embossed product is acceptable.

Although several specific Examples of the inventive concept have been described, the invention in its broader aspects should not be construed as limited thereto but should be considered as including various other equivalent features as set forth in the claims appended hereto. It is to be understood that any suitable changes, modifications, and variations may be made without departing from the scope and spirit of the present inventive concept.

What is claimed is:

1. In a process for manufacturing a resilient, resinous floor covering having an embossed polyurethane surface coating, the inline manufacturing improvement which comprises: applying to a foamable resinous sheet material a urethane coating composition having a viscosity in the range of from about 10 centipoises to about 100 centipoises, the application of said urethane coating composition being accomplished by a reverse-roll coating procedure wherein the casting ratio is in the range of from about 0.8:1 to about 1.1:1; and then, in an in-line manufacturing step, heating said coated, foamable, resinous sheet material to dry and cure and harden said urethane coating composition and subsequently to blow said foamable, resinous sheet material to form a resilient, resinous floor covering having an embossed polyurethane surface coating, the extent of the curing and hardening of said urethane coating composition being controlled so as not to exceed about 80% during the heating and before the beginning of the blowing of said foamable, resinous sheet material, whereby the curing and hardening of said urethane coating composition does not proceed too far as to interfere with the subsequent formation of the embossed effects.

2. A process as defined in claim 1 wherein the speed of said resinous sheet material through said in-line manufacturing process is a variable.

3. A process as defined in claim 1 wherein the speeds of said resinous sheet material through the step of applying said urethane coating composition and the step of heating and blowing said resinous sheet material and heating and curing said applied urethane coating composition are substantially the same at all times.

4. A process as defined in claim 1, wherein said urethane coating composition contains a curing catalyst.

5. A process as defined in claim 4, wherein the control over the extent of the curing of said urethane coating composition is exercised by the amount, concentration, or type of curing catalyst in said urethane coating composition.

6. A process as defined in claim 1, wherein the curing of said urethane coating composition is controlled to a range of from about 60% to about 80%.

7. A process as defined in claim 1, wherein the curing of said urethane coating composition is controlled to a range of from about 70% to about 80%.

8. A process as defined in claim 4, wherein said curing catalyst is dibutyl tin dilaurate.

9. A process as defined in claim 1, wherein the viscosity of said urethane coating composition is in the range of from about 40 centipoises to about 100 centipoises.

10. A process for manufacturing a resilient, resinous floor covering having an embossed polyurethane surface coating which comprises: forming a foamable, resinous sheet material containing a blowing agent; applying a printing ink composition containing an inhibitor for said blowing agent to the surface of said foamable, resinous sheet material in a predetermined pattern; applying to said printed, foamable, resinous sheet material a urethane coating composition having a viscosity in the range of from about 10 centipoises to about 100 centipoises, the application of said urethane coating composition being accomplished by a reverse-roll coating procedure wherein the casting ratio is in the range of from about 0.8:1 to about 1.1:1; and then, in an in-line manufacturing step, heating said coated, printed, foamable, resinous sheet material to dry and cure and harden said urethane coating composition and subsequently to blow said foamable, resinous sheet material to form a resilient, resinous floor covering having an embossed polyurethane surface coating, the extent of the curing and hardening of said urethane coating composition being controlled so as not to exceed about 80% during the heating and before the beginning of the blowing of said foamable, resinous sheet material by said blowing agent, whereby the curing and hardening of said urethane coating composition does not proceed too far as to interfere with the subsequent blowing and formation of the embossed effects.

* * * * *